Figure 1:
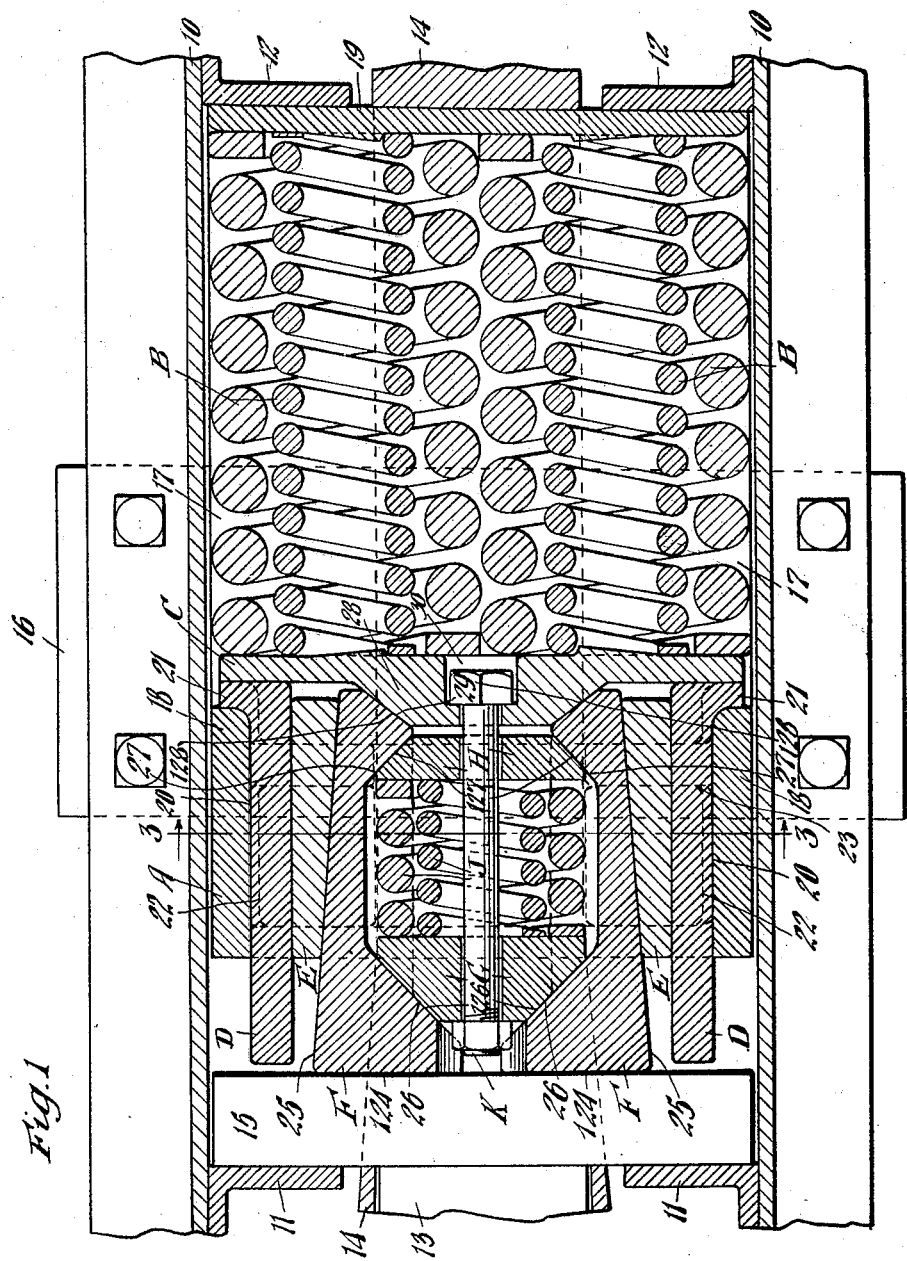

May 25, 1926.

S. B. HASELTINE 1,585,708

FRICTION SHOCK ABSORBING MECHANISM

Filed August 4, 1924  2 Sheets-Sheet 1

Witnesses
Wm. Geiger

Inventor
Stacy B. Haseltine
By George I. Haight
His Atty.

May 25, 1926.
S. B. HASELTINE
1,585,708
FRICTION SHOCK ABSORBING MECHANISM
Filed August 4, 1924    2 Sheets-Sheet 2
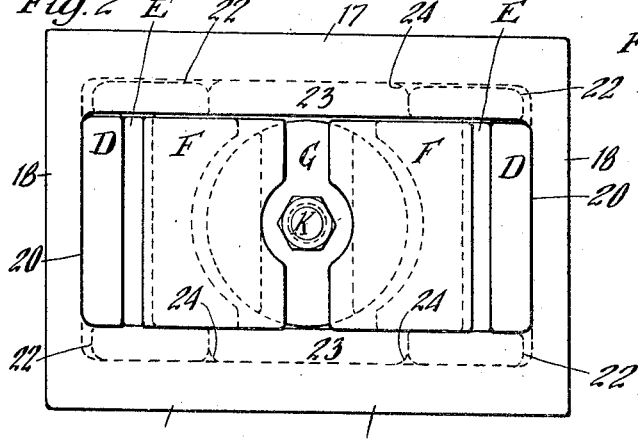
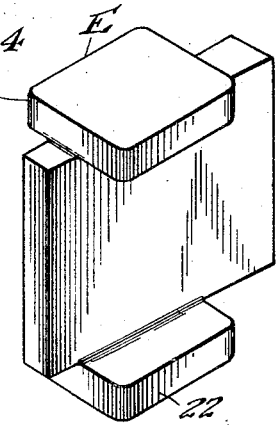
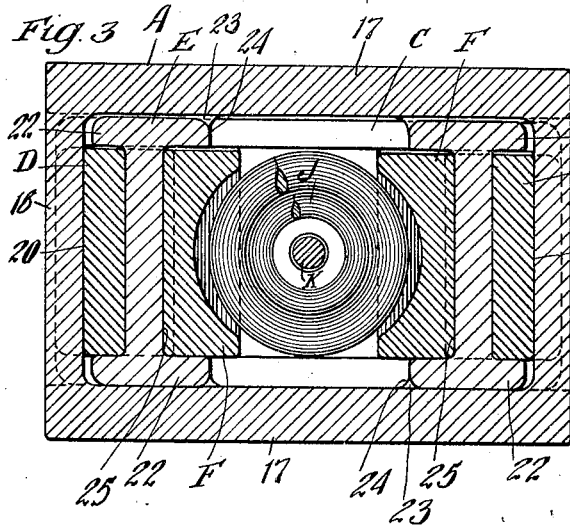
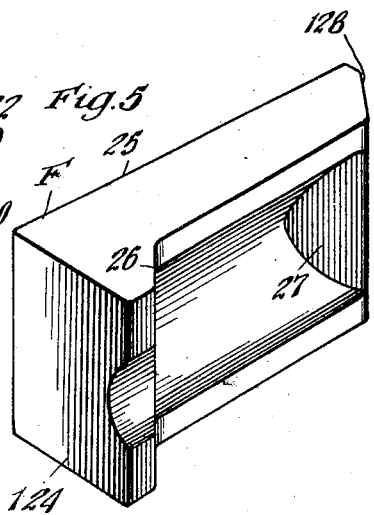
Witnesses
Wm. Geiger
Inventor
Stacy B. Haseltine
By George I. Haight
His Atty Patented May 25, 1926.

1,585,708

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 4, 1924. Serial No. 729,874.

This invention relates to improvements in friction shock absorbing mechanisms.

One object of the invention is to provide a friction shock absorbing mechanism, more particularly adapted for railway draft riggings, comprising a plurality of friction elements and wedge acting means, wherein is obtained high capacity due to relatively large frictional areas, together with preliminary action of the wedge friction means prior to actual relative movement of the friction elements.

Another object of the invention is to provide a friction shock absorbing mechanism of the character indicated, having a relatively light initial action and a gradually increasing resistance during the remainder of the compression stroke.

Other objects and advantages of the invention will more fully and clearly appear from the description and claims hereinafter following.

In the drawings forming a part of this specification, Figure 1 is a longitudinal, horizontal, sectional view of a portion of a railway draft rigging showing my improvements in connection therewith. Figure 2 is a front end, elevational view of the shock absorbing mechanism proper. Figure 3 is a vertical, transverse, sectional view corresponding substantially to the line 3—3 of Figure 1. Figure 4 is a detail, perspective view of a wedge friction member used in connection with my improved mechanism. And Figure 5 is a detail, perspective view of one of the wedge friction shoes of said mechanism.

In said drawings, 10—10 indicate channel-shaped center or draft sills of a railway car underframe, to the inner faces of which are secured front stop lugs 11—11 and rear stop lugs 12—12. A portion of the drawbar is indicated at 13, the same being operatively connected to a hooded yoke 14, within which the shock absorbing mechanism proper and a front follower 15 are contained. The yoke and the parts therewithin are supported in operative position by a detachable saddle plate 16.

The improved shock absorbing mechanism proper, as shown, comprises broadly a combined friction shell and spring cage casting A; twin arranged spring resistance elements B—B; a spring follower C; two movable friction elements D—D; two wedge friction elements E—E; a pair of wedge friction shoes F—F; a wedge block G; a second wedge block H; an auxiliary spring resistance J and a retainer bolt K.

The casting A, as shown, is formed with top and bottom walls 17—17, side walls 18—18, and an integral rear wall 19, the latter functioning as the rear follower of the mechanism. The side walls 18 are left comparatively short, so as to leave the major portion of the sides of the casting open to permit the insertion and removal of certain parts of the mechanism. The side walls 18 are provided on their inner faces with longitudinally extending friction surfaces 20.

The two movable friction elements D are of like design, each being in the form of a relatively heavy plate having a laterally extending, outwardly projecting flange 21 at the rear end thereof adapted to coact with the rear edge of the corresponding side wall 18 to limit its outward movement. The parts are so proportioned that when the plates D are in their outermost position, as most clearly shown in Figure 1, the front ends thereof will be slightly spaced from the inner surface of the front follower 15. The outer faces of the elements D coact with the corresponding friction surfaces 20 of the shell.

The wedge friction members E which are also of like design, are disposed on opposite sides of the mechanism, each cooperating with the corresponding friction element D. As most clearly shown in Figure 4, each friction wedge member E is slightly tapered longitudinally, so that the opposed inner surfaces of said elements converge inwardly of the mechanism as most clearly shown in Figure 1. Each member E is provided with top and bottom, horizontally disposed plate-like sections 22 projecting beyond the opposite sides of the main body portion of the element E and having their front and rear edges spaced inwardly from the corresponding ends of said element. The top and bottom sections 22 of the elements E cooperate with transverse ribs 23 provided on the top and bottom walls 17 of the casing A adjacent the inner and outer ends of the friction shell portion thereof. As most clearly shown in Figures 2 and 3, the ribs 23 at the front end of the shell extend entirely across the same, while the ribs at the rear end of said shell are cut away centrally to provide openings 24 to permit the assembling of the mechanism. It will be evident that the ribs cooperating with the plate sections 22 of the elements E serve to prevent longitudinal movement of the elements E with reference to the casing A, but permit lateral displacement of the same.

The friction wedge shoes F are also of like construction, each being provided at the front end thereof with a transverse flat face 124 adapted to abut the inner surface of the front follower 15. Each shoe is also provided with a longitudinally disposed outer friction surface 25 correspondingly inclined to the inner surface of the corresponding element E and adapted to cooperate therewith. On the side nearest the axis of the shell, each shoe is cut away to provide a front wedge face 26 and a rear wedge face 27, the front wedge faces 26 of the two shoes diverging inwardly of the mechanism and the rear wedge faces 27 converging inwardly of the mechanism. Between the wedge faces 26 and 27, the inner surface of each shoe is concave, as shown, to accommodate the corresponding side of the auxiliary spring J and permit slight clearance to allow relative approach of the shoes F toward the central axis of the mechanism.

The wedge block G is provided with a pair of wedge faces 126 at the front end thereof, correspondingly inclined to the wedge faces 26 and adapted to cooperate therewith. The wedge block H is also provided with a pair of wedge faces 127 correspondingly inclined to and adapted to cooperate with the wedge faces 27 of the shoes F. Movement of the wedge members G and H relatively toward each other is yieldingly resisted by the auxiliary spring J which is interposed therebetween. Said spring comprises a relatively light inner coil and a relatively heavier outer coil having their opposite ends bearing on the wedge members G and H, respectively.

The spring follower C is in the form of a relatively heavy rectangular plate having a central extension 28 at the front side thereof, said extension having beveled edges 29—29 at the opposite sides thereof adapted to engage correspondingly beveled faces 128 at the inner ends of the shoes F. The cooperating faces 29 and 128 offer resistance to the lateral approach of the shoes F, thus tending to give additional resistance to collapse of wedge unit comprising the shoes F and wedge blocks G and H. The follower C is also provided with top and bottom ribs engaging the inner ribs 23 of the casing A, limiting the outward movement of the spring follower and thereby maintaining the spring resistance under initial compression. The main spring resistance elements B comprise two sets of twin arranged springs, each twin spring including an outer, relatively heavy coil and an inner relatively lighter coil bearing on the end wall 19 of the casing A and the inner surface of the spring follower C respectively.

The two wedge friction shoes F, the wedge block G and the wedge block H, together, form a collapsible wedge unit which is held in assembled relation by the retainer bolt K having its front and rear ends anchored respectively to the wedge block G and the spring follower C, the latter being provided with a recess 30, adapted to accommodate the head of said bolt, the shank of the bolt extending through the inner coil of the spring resistance J and aligned openings in the wedge members G and H respectively. The bolt K is so adjusted as to maintain the parts of the collapsible wedge unit under initial compression and of uniform overall length and the spring resistance J serves to yieldingly resist collapse of said unit.

In assembling the mechanism, the wedge friction members E are inserted into the friction shell through the casing A, being inserted through the openings in the sides of the latter, and then passed through the openings 24 provided between the ribs 23 at the rear end of the friction shell. This operation is preferably performed prior to the placing of the other parts within position, however, the elements D may be placed in position either before or after the members E have been assembled with the shell. The spring resistance elements B and the spring follower C are also inserted within the casing A through the openings provided in the opposite sides thereof.

The operation of my improved shock absorbing mechanism is as follows, assuming an inward or compression movement of the drawbar. During the time that the pressure is transmitted through the shoes F to the spring resistance elements B and the shoes are moved rearwardly therewith, a wedging action will be set up between the shoes and the wedge members E, placing the friction elements D and the wedge elements E under lateral pressure. At this time, the spring pressed wedge members G and H will yieldingly resist the collapse of the wedge unit comprising the shoes F and said wedge blocks. As the wedge unit moves inwardly of the casing A, there will be an additional relative movement of the shoes F toward each other, due to the converging relation of the inner surfaces of the friction wedge members E, the coacting wedge faces 26 and 126 and 27 and 127 slipping relatively, forcing the wedge blocks G and H toward each other and compressing the auxiliary spring J. This action will continue throughout the closing movement. After a limited movement as described, the main follower 15 comes into engagement with the front ends of the friction elements D, whereupon the friction elements will be carried rearwardly in unison with the follower, greatly augmenting the friction resistance offered. In this connection, it is pointed out that during the initial action of the mechanism, the main spring follower will be moved out of contact with the rear ends of the friction elements D and will remain out of contact therewith during the remainder of the compression stroke. The inward movement of the main follower and the parts actuated thereby will continue until the actuating force is removed or the follower comes into abutment with the front end of the casing A. When the follower engages the casing A, the actuating force will be transmitted directly through the casing to the rear stop lugs, the casing acting as a stop column to prevent the springs from being driven solid.

When the actuating pressure is reduced, the main spring resistance B will return all of the parts to normal position and the auxiliary spring J will expand the collapsible wedge to its original size. In this connection, it is pointed out that the initial action during release will be an outward movement of the wedge unit, due to the spring follower C being spaced from the inner ends of the friction elements D as hereinbefore pointed out. After the initial release action just described, the spring follower C will pick up the friction elements D and carry them outwardly to their normal position with the flanges 21 thereof in engagement with the rear abutment faces of the side walls 18 of the casing and their front ends spaced from the main follower 15.

I have herein shown and described what I now consider to be the preferred manner of carrying out my invention, but the same is merely illustrative and I contemplate all changes and modifications that come within the scope of the claims appended hereto.

I claim:

1. In a friction shock absorbing mechanism, the combination with a friction shell having interior, longitudinally disposed friction surfaces; of cooperating relatively movable friction elements within said shell, certain of said elements engaging the shell friction surfaces and the remaining elements being tapered and having inner friction surfaces inclined with reference to the axis of the mechanism; an expandible and contractible wedge pressure transmitting unit; a main spring resistance opposing inward movement of said wedge unit; and yielding means acting independently of said main spring resistance tending to maintain the unit expanded.

2. In a friction shock absorbing mechanism, the combination with a main follower; of a friction shell having means thereon presenting longitudinally disposed, interior, inwardly converging friction surfaces; a friction unit cooperating with said friction surfaces, said unit including a pair of friction wedge shoes engaged by said follower, and a pair of wedge blocks, said wedge blocks and shoes having cooperating sets of wedge faces; a main spring resistance; and a spring resistance interposed between said wedge blocks.

3. In a friction shock absorbing mechanism, the combination with a friction shell having means thereon presenting interior, longitudinally disposed, inwardly converging friction surfaces; a friction unit including friction shoes, a pair of wedge blocks and a spring resistance, said shoes cooperating with said friction surfaces and each having wedge faces at the front and rear ends thereof cooperating respectively with said wedge blocks, said spring resistance being interposed between said wedge blocks; and a main spring resistance for said friction unit.

4. In a friction shock absorbing mechanism, the combination with a friction shell having interior, friction surfaces; of a main spring resistance; relatively movable, longitudinally disposed friction elements cooperating with said shell friction surfaces; longitudinally disposed friction members cooperating with said friction elements; friction shoes cooperating with said friction members, said shoes having wedge faces at the front and rear ends thereof; wedge blocks cooperating with said front and rear wedge faces; and a spring resistance interposed between said wedge blocks.

5. In a friction shock absorbing mechanism, the combination with a friction shell having interior friction surfaces; of a main spring resistance; relatively movable, longitudinally disposed friction elements cooperating with said shell friction surfaces; longitudinally disposed, wedge friction members cooperating with said friction elements; friction shoes cooperating with said friction members, said shoes having wedge faces at the front and rear ends thereof; wedge blocks cooperating with said front and rear wedge faces; and a spring resistance interposed between said wedge blocks.

6. In a friction shock absorbing mechanism, the combination with a friction shell having opposed interior friction surfaces; of a main spring resistance; an elongated friction element cooperating with each shell friction surface; a pair of friction wedge shoes, said shoes each having front and rear interior wedge faces; a tapered friction block interposed between each shoe and element; wedge blocks cooperating with the wedge faces at the opposite ends of said shoes; an auxiliary spring resistance interposed between said blocks; and a spring follower interposed between said main spring resistance and the inner ends of said shoes.

7. In a friction shock absorbing mechanism, the combination with a main follower; of a friction shell having opposed interior friction surfaces; a main spring resistance; an elongated friction element cooperating with each shell friction surface; stop means limiting the outward movement of said elements and maintaining the same normally spaced from said follower; a pair of friction wedge shoes bearing on said follower, the said shoes each having front and rear interior wedge faces; a tapered friction block interposed between each shoe and element; wedge blocks cooperating with the wedge faces at the opposite ends of said shoes; a second spring resistance interposed between said blocks; and a spring follower interposed between said main spring resistance and the inner ends of said shoes, said follower normally engaging said friction elements to hold the latter in abutment with said stop means.

In witness that I claim the foregoing I have hereunto subscribed my name this 31st day of July 1924.

STACY B. HASELTINE.